United States Patent [19]

Spielmann et al.

[11] Patent Number: 4,586,580

[45] Date of Patent: May 6, 1986

[54] MOUNTING FOR POWER-ASSISTED MASTER BRAKE CYLINDER IN AN AUTOMOTIVE VEHICLE

[75] Inventors: Norbert Spielmann; Udo Güssbacher, both of Ebern; Wolfgang Walther, Schorkendorf; Hermann Bauer, Lülsfeld, all of Fed. Rep. of Germany

[73] Assignee: Fag Kugelfischer Georg Schafer & Co., Schweinfurt, Fed. Rep. of Germany

[21] Appl. No.: 462,775

[22] Filed: Feb. 1, 1983

[30] Foreign Application Priority Data

Feb. 3, 1982 [DE] Fed. Rep. of Germany ....... 3203496

[51] Int. Cl.[4] ................. B62D 23/00; B60T 13/00
[52] U.S. Cl. .................... 180/89.1; 60/533; 60/547.1
[58] Field of Search ............... 60/547.1, 533; 92/169 A, 169 B, 169 C, 169 R; 403/392; 206/805, 335, 318, 319; 248/499; 220/322, 324, 326; 180/89.1

[56] References Cited

U.S. PATENT DOCUMENTS

| | | | |
|---|---|---|---|
| 2,213,738 | 9/1940 | Larsen | 248/499 |
| 2,550,870 | 5/1951 | Saunders | 206/335 |
| 3,222,868 | 12/1965 | Stelzer | 60/551 |
| 3,416,759 | 12/1968 | Arnett | 248/499 |
| 3,480,241 | 11/1969 | Moyer | 248/499 |
| 4,246,755 | 1/1981 | Weiler | 60/547.1 |

FOREIGN PATENT DOCUMENTS

| | | |
|---|---|---|
| 2814372 | 4/1978 | Fed. Rep. of Germany. |
| 2070170A | 9/1981 | United Kingdom ............... 92/169 |

Primary Examiner—Abraham Hershkovitz
Attorney, Agent, or Firm—Karl F. Ross; Herbert Dubno

[57] ABSTRACT

An assembly of a master brake cylinder and an associated power cylinder of larger diameter, disposed in front of the dashboard of an automotive vehicle with an extension traversing that dashboard, is held together by a flexible retainer such as a strap or a wire embracing the master cylinder and at least part of the outer periphery of the power cylinder under tension. The extremities of the retainer may be anchored directly to the dashboard and its center part is braced against the front end of the master cylinder by an adjustable tensioning device.

9 Claims, 9 Drawing Figures

MOUNTING FOR POWER-ASSISTED MASTER BRAKE CYLINDER IN AN AUTOMOTIVE VEHICLE

FIELD OF THE INVENTION

Our present invention relates to a mounting for a power-assisted master cylinder of a hydraulic brake system supported in an engine compartment of an automotive vehicle on a dashboard separating that compartment from the interior of the vehicle, i.e. from the driver's position.

BACKGROUND OF THE INVENTION

In such a brake system it is customary to mount a power cylinder on the front side of the dashboard, i.e. within the engine compartment, and to let a hub thereof extend through an aperture in the dashboard in order to facilitate the linking of a control valve in the power cylinder with a brake pedal on the driver's side; see, for example, U.S. Pat. No. 3,222,868. With the power cylinder split into a lid or header adjoining the dashboard and a body or base remote therefrom, the master cylinder of the hydraulic brake system—which is generally of smaller diameter than the power cylinder—can be coaxially attached to that base. It has already been proposed to envelop the two parts of the power cylinder in a basket-like holder with a central flange supporting the master cylinder at its end proximal to the power cylinder, that holder having struts which are bent in axial planes around the periphery of the power cylinder and are anchored to the dashboard; see German laid-open application No. 28 14 372. The purpose of this holder is to prevent an axial expansion of the power cylinder, in response to a brake-operating pressure applied to the piston of the master cylinder, and thus to avoid a significant displacement of the latter cylinder relative to the dashboard.

In order to achieve this purpose, both the holder and the master cylinder must be made of rigid and correspondingly heavy material designed to withstand the applied braking pressure as reinforced in the power cylinder. Since the holder is not readily adjustable, it must be adapted to the contour of the power cylinder with close tolerances to obviate undesirable variations in the pedal stroke.

OBJECTS OF THE INVENTION

The general object of our present invention is to provide an improved mounting for the combination of such a master cylinder with an associated power cylinder which can be conveniently fitted to an existing structure, reduces the stress exerted upon the master cylinder and can be simply and inexpensively produced.

A more particular object is to provide a mounting of this character which has a certain degree of adjustability to accommodate assemblies of different dimensions.

SUMMARY OF THE INVENTION

Such a mounting, pursuant to our present invention comprises a flexible retainer which embraces the master cylinder and at least part of the periphery of the adjoining power cylinder under tension for holding them together, this retainer passing around the free end of the master cylinder.

Advantageously, the retainer has extremities anchored to the dashboard at opposite sides of the aperture traversed by the extension or hub of the power cylinder.

In accordance with another feature of our invention, we provide bracing means interposed between the retainer and the free end of the master cylinder.

The flexible retainer could be a wire or cable but preferably is designed as a strap of a certain width which may be on the order of the radius of the master cylinder engaged thereby. Such a retainer, if provided with the aforementioned bracing means, can be readily slipped off the assembly upon reduction of its tension if the master cylinder or the power cylinder has to be made accessible for inspection or repair.

BRIEF DESCRIPTION OF THE DRAWING

The above and other features of our invention will now be described in detail with reference to the accompanying drawing in which.

SPECIFIC DESCRIPTION

Figure 1:
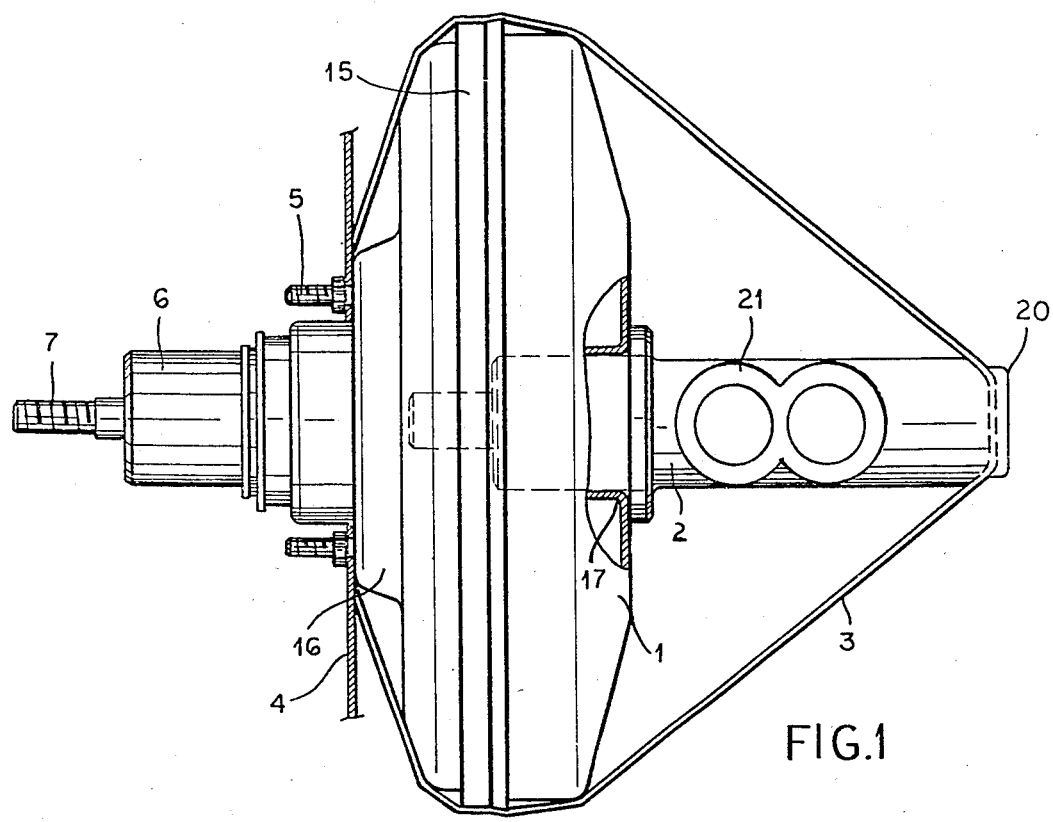
FIG. 1 is a top view of an assembly of master cylinder, power cylinder and retainer according to our invention.

In FIG. 1 we have shown the combination of a master cylinder 2 of a hydraulic brake system with an associated power cylinder having a body 1 and a lid 15, the two cylinders being coaxially interfitted and carried on the front side of a dashboard 4 of an automotive vehicle not further illustrated. The lid 15 of the power cylinder is formed with a boss 16 resting against dashboard 4; the latter has an aperture 40 (FIG. 2) traversed by a hub 6 of that cylinder. A link 7 projecting from hub 6 forms part of a connection between a nonillustrated brake pedal on the driver's side of dashboard 4 and a valve inside power cylinder 1, 15; this cylinder may be a servomotor of the vacuum-operated type connected via a low-pressure line (not shown) to the manifold of the vehicular engine. Master cylinder 2 is provided with a cap 21 overlying the usual filling openings for two cascaded sections thereof.

Figures 7A, 7B:
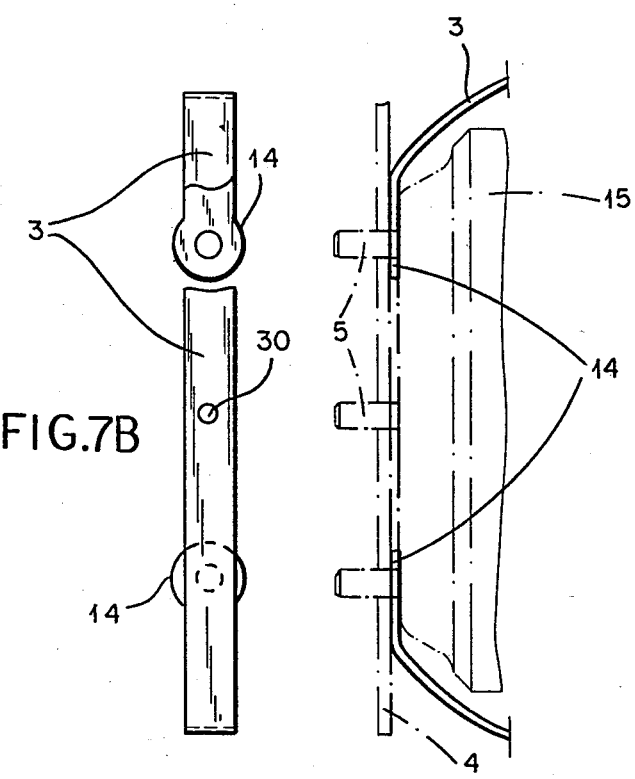
FIG. 7A is a fragmentary side view of the retainer included in the assembly of FIG. 1.
FIG. 7B is a front view of the retainer of FIG. 7A.

In accordance with our present invention, a flexible strap 3 of metal or other suitable material is led in an axial plane about the free front end of master cylinder 2 and about the outer periphery of power cylinder 1, 15 whose diameter substantially exceeds that of cylinder 2. In the embodiment of FIG. 1, the extremities of strap 3 have eyes 14 as illustrated in FIGS. 7A and 7B which are traversed by bolts 5 projecting from boss 16 to fasten the cylinder lid 15 to the dashboard 4. Such fasteners are also shown in FIG. 7A where lid 15 has been partly illustrated in phantom lines. The central part of strap 3 is straddled by ridges 20 of cylinder 2 and, advantageously, is under stress from a bracing device described hereinafter with reference to FIGS. 4A and 4B. Thus, the two coaxial cylinders 2 and 1, 15 are firmly held together and secured to the dashboard 4, any axial expansion thereof under an applied braking force being restrained by the strap. When the latter is loosened, as by a relaxation of the bracing device, it can be slipped off the end of master cylinder 2 which thereupon can be detached from the body 1 of the power cylinder.

With this arrangement the junction between the two cylinders, formed by a shoulder 22 on cylinder 2 bearing upon a flange 17 of cylinder body 1, is also relieved of stress so that the material of the cylinder body need only be strong enough to sustain the partial vacuum present therein. On the other hand, with the strap 3 under tension, the assembly can be bodily detached from the dashboard 4 upon removal of the nuts engaging the bolts 5.

Figure 2:
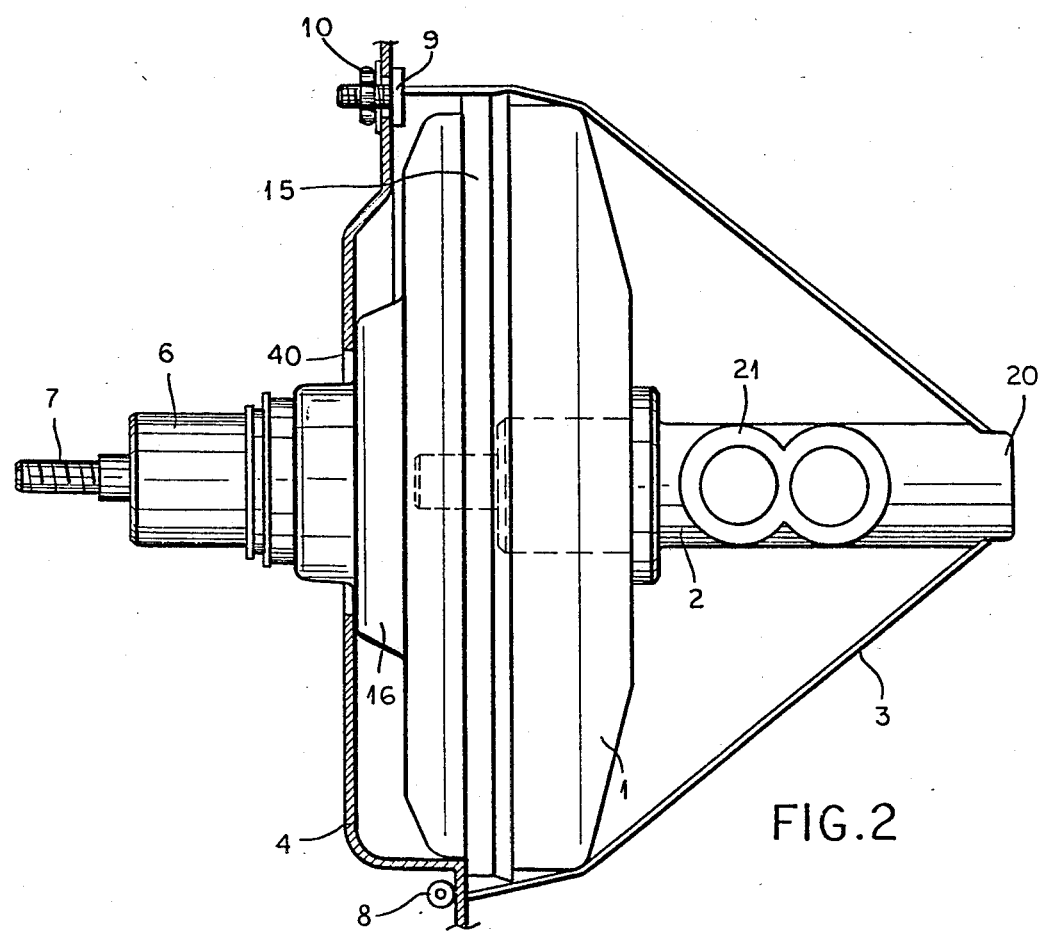
FIGS. 2 and 3 are views similar to FIG. 1, showing certain modifications.

FIG. 2 shows the strap 3 connected with the dashboard in a somewhat different manner, i.e. by an articulated joint 8 at one end and by a screw 9 and nut 10 at the other end. This latter connection is independent of the fasteners 5 of the power cylinder, shown in FIG. 1, which could even be omitted in the present instance. The screw connection 9, 10 can also be replaced by some other joint, e.g. one of the toggle type enabling a quick loosening of the strap.

Figure 3:
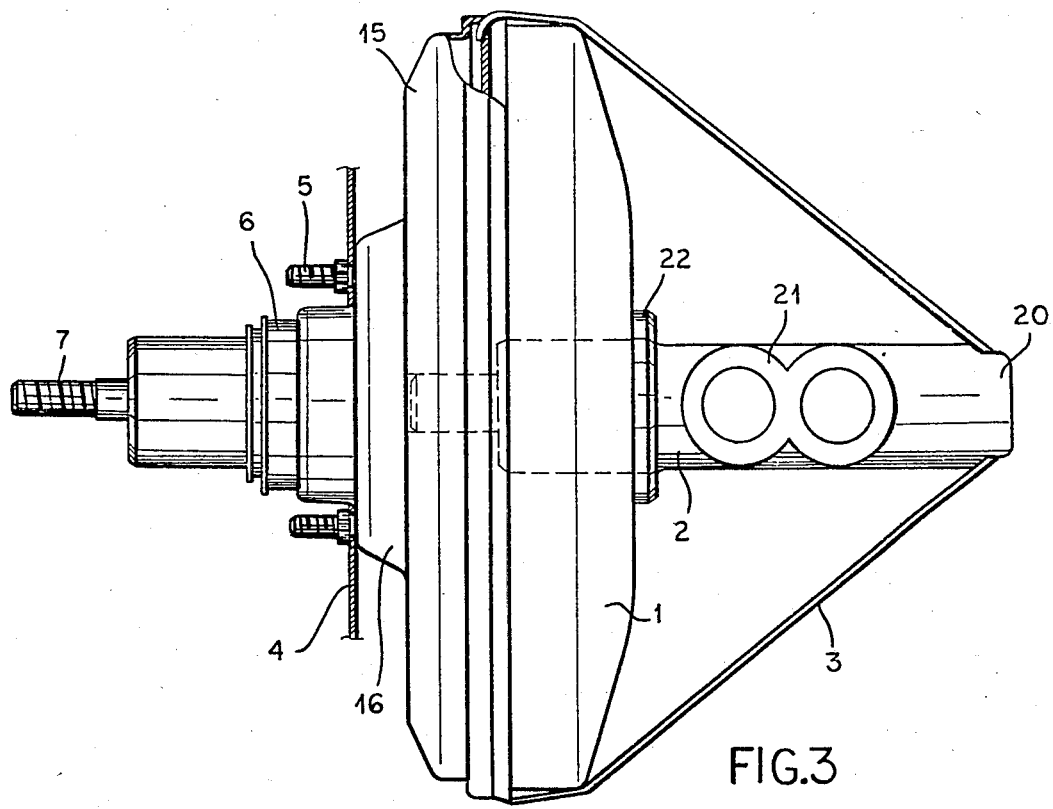

The arrangement of FIG. 3 differs from that of FIGS. 1 and 2 in that the ends of the strap 3 are not anchored to dashboard 4 but are clamped between the body 1 and the lid 15 of the power cylinder. This simplified assembly requires a somewhat firmer lid 15 but otherwise offers virtually the same advantages as the two preceding embodiments.

Figure 4A:
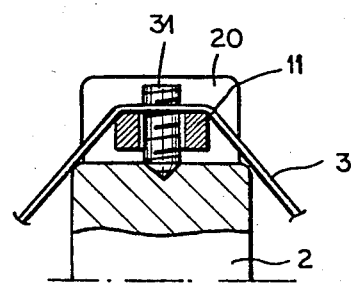
FIG. 4A is a cross-sectional detail view of a bracing device included in the assemblies of FIGS. 1-3.
Figure 4B:
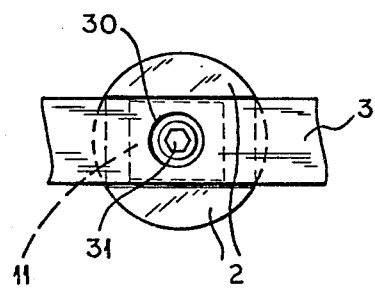
FIG. 4B is a front view of the detail shown in FIG. 4A.

As shown in FIGS. 4A and 4B, the aforementioned bracing device comprises a rectangular nut 11 slidably bracketed by two ridges 20 of master cylinder 2 which also serve for the guidance of the central part of strap 3. Nut 11 is engaged by a pressure bolt 31 which projects through a hole 30 in strap 3 and can be turned by an Allen wrench to vary the distance between the nut and the bottom of the diametrical groove defined by ridges 20. If necessary, a counternut could be screwed onto the projecting end of bolt 31 to prevent accidental loosening of the strap. This device is representative of a variety of strap-tensioning means that can be used.

Figure 5:
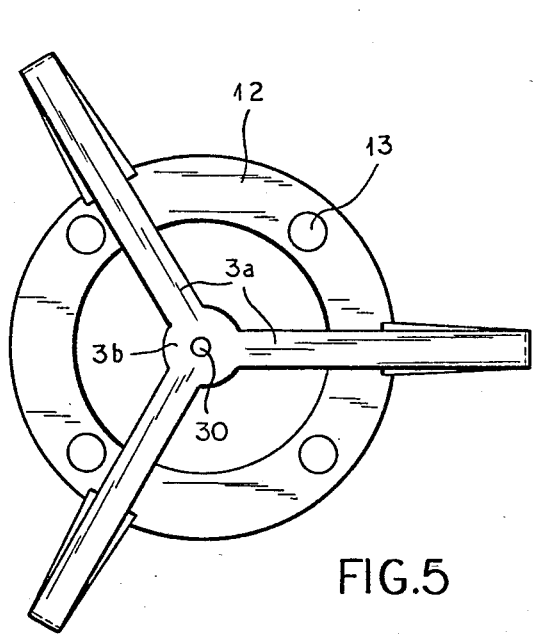
FIG. 5 is a front view of a modified retainer according to our invention.
Figure 6:
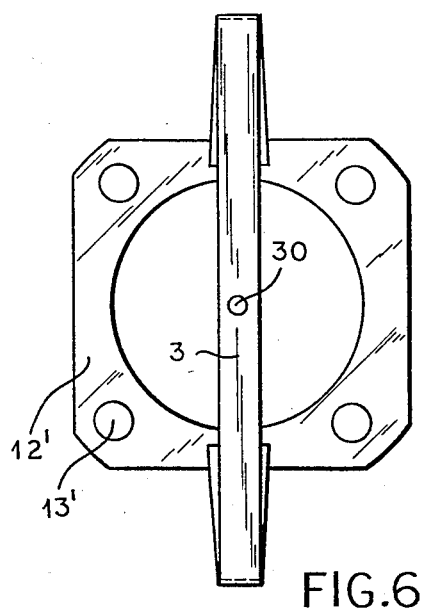
FIG. 6 is a view similar to FIG. 5, illustrating another modification.

In FIG. 5 we have shown a modified retainer with three angularly equispaced strap portions 3a secured to an annular flange 12. The flange 12 has holes 13 which can receive fasteners such as those shown at 5 in FIGS. 1 and 3 and which will then bear upon the boss 16 of the power-cylinder lid 15 while the junction of the three strap portions 3a is a disk 3b to be fitted onto the free end of master cylinder 2 which must be suitably modified to accommodate these strap portions. A similar arrangement is shown in FIG. 6 where the annular flange 12 has been replaced by a square flange 12' with corner holes 13' and with a single strap 3, of the type described above, attached to that flange by its extremities.

We claim:

1. In an automotive vehicle having an engine compartment separated by a dashboard from the interior of the vehicle, a power cylinder on the engine side of the dashboard with an actuator linked by way of an aperture in said dashboard to a brake pedal on a driver's side thereof, and a master brake cylinder of lesser diameter coaxially adjoining said power cylinder in the engine compartment, the combination therewith of a flexible retainer in said engine compartment reaching around and peripherally embracing said master brake cylinder and said power cylinder under tension for holding same together, said retainer passing around a free end of said master brake cylinder with extremities anchored to said dashboard on opposite sides of said aperture.

2. The combination defined in claim 1 wherein said extremities have eyes traversed by fasteners securing said power cylinder to said dashboard.

3. The combination defined in claim 1 wherein said extremities terminate in a flange framing said aperture, said flange having holes traversed by fasteners securing said power cylinder to said dashboard.

4. The combination defined in claim 1, further comprising adjustable bracing means interposed between said retainer and said free end.

5. The combination defined in claim 4 wherein said retainer is a strap with a central part overlying said bracing means.

6. The combination defined in claim 5 wherein said free end has ridges bracketing said central part, said bracing means being disposed between said ridges.

7. In an automotive vehicle having an engine compartment separated by a dashboard from the interior of the vehicle, a power cylinder fastened to the engine side of the dashboard with an actuator linked by way of an aperture in said dashboard to a brake pedal on a driver's side thereof, and a master brake cylinder of lesser diameter coaxially adjoining said power cylinder in the engine compartment, the combination therewith of a flexible retainer in said engine compartment reaching around and peripherally embracing said master brake cylinder and at least part of said power cylinder under tension for holding same together, said retainer passing around a free end of said master brake cylinder with extremities anchored to said power cylinder, and adjustable braking means interposed between said retainer and said free end.

8. The combination defined in claim 7 wherein said retainer is a strap with a central part overlying said bracing means.

9. The combination defined in claim 8 wherein said free end has ridges bracketing said central part, said bracing means being disposed between said ridges.

* * * * *